(12) United States Patent
Huang (10) Patent No.: US 10,819,154 B2
(45) Date of Patent: Oct. 27, 2020

(54) INDUCTIVE POWER TRANSMITTER

(71) Applicant: Apple Inc., Cupertino, CA (US)

(72) Inventor: Rex Pius Huang, Auckland (NZ)

(73) Assignee: Apple Inc., Cupertino, CA (US)

(*) Notice: Subject to any disclaimer, the term of this patent is extended or adjusted under 35 U.S.C. 154(b) by 101 days.

(21) Appl. No.: 16/041,553

(22) Filed: Jul. 20, 2018

(65) Prior Publication Data

US 2018/0351409 A1 Dec. 6, 2018

Related U.S. Application Data

(63) Continuation of application No. PCT/NZ2017/050113, filed on Aug. 31, 2017.

(60) Provisional application No. 62/383,787, filed on Sep. 6, 2016.

(51) Int. Cl.
*H02J 50/12* (2016.01)
*H04B 5/00* (2006.01)
*H02J 5/00* (2016.01)
*H02M 1/08* (2006.01)
*H02J 50/80* (2016.01)
*H02M 3/335* (2006.01)

(52) U.S. Cl.
CPC .............. *H02J 50/12* (2016.02); *H02J 5/005* (2013.01); *H02J 50/80* (2016.02); *H02M 1/08* (2013.01); *H02M 3/33507* (2013.01); *H02M 3/33569* (2013.01); *H04B 5/0037* (2013.01); *H04B 5/0081* (2013.01)

(58) Field of Classification Search
CPC ............ H02J 50/12; H02J 50/80; H02J 5/005; H02M 1/08; H02M 3/33507; H02M 3/33569; H04B 5/0037; H04B 5/0081

USPC ......................................................... 307/104
See application file for complete search history.

(56) References Cited

U.S. PATENT DOCUMENTS

| | | |
|---|---|---|
| 3,898,549 A | 8/1975 | Mitchell |
| 4,729,088 A | 3/1988 | Wong |
| 4,797,541 A | 1/1989 | Billings et al. |
| 4,959,765 A | 9/1990 | Weinburg |
| 5,293,308 A | 3/1994 | Boys et al. |
| 5,304,917 A | 4/1994 | Somerville |
| 5,386,359 A | 1/1995 | Nochi |

(Continued)

FOREIGN PATENT DOCUMENTS

| | | |
|---|---|---|
| CN | 101728965 A | 6/2010 |
| CN | 103795261 A | 5/2014 |

(Continued)

OTHER PUBLICATIONS

Chongwen Zhao et al. "Active Resonance Wireless Power Transfer System Using Phase Shift Control Strategy," IEEE Applied Power Electronics Conference and Exposition, Apr. 24, 2014, p. 1336-1341, College of Electrical Engineering, Hangzhou, China.

(Continued)

*Primary Examiner* — Hal Kaplan
(74) *Attorney, Agent, or Firm* — Blank Rome LLP (57) ABSTRACT

An inductive power transmitter for an inductive power transfer system including a power regulation circuit utilising only primary side parameters to control power flow. The duty cycle of the waveform applied to the transmitter coil is adjusted based on the ratio of the output current of the power supply and the current supplied to the resonant circuit (the current ratio). This may be further compensated based on the amount of power supplied to the transmitter.

19 Claims, 5 Drawing Sheets

(56) References Cited

U.S. PATENT DOCUMENTS

| | | |
|---|---|---|
| 5,428,521 A | 6/1995 | Kigawa et al. |
| 5,510,974 A | 4/1996 | Gu et al. |
| 5,570,278 A | 10/1996 | Cross |
| 5,654,881 A | 8/1997 | Albrecht et al. |
| 5,751,560 A | 5/1998 | Yokoyama |
| 5,898,579 A | 4/1999 | Boys et al. |
| 5,923,308 A | 7/1999 | Wei et al. |
| 6,021,052 A | 2/2000 | Unger et al. |
| 6,069,801 A | 5/2000 | Hodge, Jr. et al. |
| 6,069,803 A | 5/2000 | Cross |
| 6,141,225 A | 10/2000 | Gak et al. |
| 6,191,957 B1 | 2/2001 | Peterson |
| 6,249,444 B1 | 6/2001 | Cross |
| 6,473,318 B1 | 10/2002 | Qian et al. |
| 6,587,356 B2 | 7/2003 | Zhu et al. |
| 6,728,118 B1 | 4/2004 | Chen et al. |
| 6,803,744 B1 | 12/2004 | Sabo |
| 7,180,759 B2 | 2/2007 | Liptak et al. |
| 7,279,850 B2 | 10/2007 | Boys et al. |
| 7,521,890 B2 | 4/2009 | Lee et al. |
| 7,548,436 B1 | 6/2009 | Chen |
| 7,606,051 B1 | 10/2009 | Wittenbreder, Jr. |
| 7,639,514 B2 | 12/2009 | Baarman |
| 7,640,757 B2 | 1/2010 | Lee |
| 7,764,515 B2 | 7/2010 | Jansen et al. |
| 7,948,208 B2 | 5/2011 | Partovi et al. |
| 8,169,185 B2 | 5/2012 | Partovi et al. |
| 8,314,513 B2 | 11/2012 | Aoyama et al. |
| 8,417,359 B2 | 4/2013 | Tsai et al. |
| 8,446,251 B2 | 5/2013 | Kozuma et al. |
| 8,587,154 B2 | 11/2013 | Fells et al. |
| 8,629,654 B2 | 1/2014 | Partovi et al. |
| 8,855,554 B2 | 10/2014 | Cook et al. |
| 8,884,469 B2 | 11/2014 | Lemmens et al. |
| 8,912,730 B2 | 12/2014 | Nakajo et al. |
| 8,923,015 B2 | 12/2014 | Madawala et al. |
| 9,168,083 B2 | 10/2015 | Schall et al. |
| 2006/0226816 A1 | 10/2006 | Wai et al. |
| 2006/0291117 A1 | 12/2006 | Kyono |
| 2008/0013344 A1 | 1/2008 | Mori |
| 2008/0211478 A1 | 9/2008 | Hussman et al. |
| 2009/0003862 A1 | 1/2009 | Tominaga |
| 2009/0096413 A1 | 4/2009 | Partovi et al. |
| 2009/0230777 A1 | 9/2009 | Baarman et al. |
| 2009/0268489 A1 | 10/2009 | Lin et al. |
| 2010/0067259 A1 | 3/2010 | Liu |
| 2010/0181961 A1 | 7/2010 | Von Novak et al. |
| 2010/0202176 A1 | 8/2010 | Hallak |
| 2010/0259217 A1 | 10/2010 | Baarman et al. |
| 2010/0327661 A1 | 12/2010 | Karalis et al. |
| 2011/0006743 A1 | 1/2011 | Fabbro |
| 2011/0046438 A1 | 2/2011 | Iwaisako |
| 2011/0221277 A1 | 9/2011 | Boys |
| 2011/0254379 A1 | 10/2011 | Madawala |
| 2011/0260681 A1 | 10/2011 | Guccione et al. |
| 2012/0002446 A1 | 1/2012 | Madawala et al. |
| 2012/0011958 A1 | 1/2012 | Kihara |
| 2012/0068550 A1 | 3/2012 | Boer et al. |
| 2012/0161535 A1 | 6/2012 | Jung et al. |
| 2012/0242163 A1 | 9/2012 | Jung et al. |
| 2012/0313577 A1 | 12/2012 | Moes et al. |
| 2013/0033118 A1 | 2/2013 | Karalis et al. |
| 2013/0043951 A1 | 2/2013 | Irish et al. |
| 2013/0147427 A1 | 6/2013 | Polu et al. |
| 2013/0154373 A1 | 6/2013 | Lisuwandi et al. |
| 2013/0234531 A1 | 9/2013 | Budgett et al. |
| 2013/0300209 A1 | 11/2013 | Long et al. |
| 2013/0307348 A1 | 11/2013 | Oettinger et al. |
| 2014/0015333 A1 | 1/2014 | Byun et al. |
| 2014/0132210 A1 | 5/2014 | Partovi |
| 2014/0159500 A1 | 6/2014 | Sankar et al. |
| 2014/0252874 A1 | 9/2014 | Niizuma |
| 2014/0293670 A1 | 10/2014 | Robertson et al. |
| 2014/0333150 A1 | 11/2014 | Iwawaki |
| 2015/0015197 A1 | 1/2015 | Mi et al. |
| 2015/0054354 A1 | 2/2015 | Lemmens et al. |
| 2015/0280455 A1 | 10/2015 | Bosshard et al. |
| 2016/0111895 A1 | 4/2016 | Bae |
| 2017/0207724 A1 | 7/2017 | Robertson et al. |
| 2017/0346339 A1 | 11/2017 | Dela Cruz |
| 2018/0097406 A1 | 4/2018 | Chen |

FOREIGN PATENT DOCUMENTS

| | | |
|---|---|---|
| CN | 104079079 A | 10/2014 |
| EP | 2286727 A1 | 2/2011 |
| EP | 2405553 A2 | 1/2012 |
| EP | 2642628 A1 | 9/2013 |
| JP | 2001297862 A | 10/2001 |
| JP | 2003219659 A | 7/2003 |
| JP | 2006149168 A | 6/2006 |
| JP | 2006529079 A | 12/2006 |
| JP | 2010200497 A | 9/2010 |
| NZ | 573241 A | 4/2011 |
| WO | 93/23908 A1 | 11/1993 |
| WO | 9908359 A1 | 2/1999 |
| WO | 2003105308 A1 | 12/2003 |
| WO | 2004042750 A1 | 5/2004 |
| WO | 2004105208 A1 | 12/2004 |
| WO | 2004105226 A1 | 12/2004 |
| WO | 2007031914 A1 | 3/2007 |
| WO | 2007100265 A1 | 9/2007 |
| WO | 2009012778 A2 | 1/2009 |
| WO | 2009037613 A1 | 3/2009 |
| WO | 2009061219 A2 | 5/2009 |
| WO | 2009081115 A1 | 7/2009 |
| WO | 2010000010 A1 | 1/2010 |
| WO | 2010030195 A1 | 3/2010 |
| WO | 2010062201 A1 | 6/2010 |
| WO | 2010115976 A1 | 10/2010 |
| WO | 2011046453 A1 | 4/2011 |
| WO | 2011099071 A1 | 8/2011 |
| WO | 2012005607 A2 | 1/2012 |
| WO | 2012030238 A1 | 3/2012 |
| WO | 2012035745 A1 | 3/2012 |
| WO | 2012125590 A2 | 9/2012 |
| WO | 2013002651 A1 | 1/2013 |
| WO | 2013020138 A2 | 2/2013 |
| WO | 2013112614 A1 | 8/2013 |
| WO | 2013164831 A1 | 11/2013 |
| WO | 2014042681 A2 | 3/2014 |
| WO | 2014057959 A1 | 4/2014 |
| WO | 2014070025 A3 | 5/2014 |
| WO | 2014091250 A2 | 6/2014 |
| WO | 2014070025 A2 | 10/2014 |
| WO | 2014201461 A1 | 12/2014 |
| WO | 2015123651 A1 | 8/2015 |
| WO | 2016001873 A1 | 1/2016 |
| WO | 2016099295 A1 | 6/2016 |

OTHER PUBLICATIONS

Bascope et al. "Isolated Flyback-Current-Fed Push-Pull Converter for Power Factor Correction." IEEE. 1996. pp. 1184-1190.

Bell. "Introduction to Push-Pull and Cascaded Power Converter Topologies." Power Point Presentation for National Semiconductor Phoenix Arizona Design Center. 2003. (22 pages).

Ben-Yaakov et al. "A Self-Adjusting Sinusoidal Power Source Suitable for Driving Capacitive Loads." IEEE. 2004. (4 pages).

Ben-Yaakov et al. "Modeling and Behavioral SPICE Simulation of a Self Adjusting Current-Fed Push-Pull Parallel Resonant Inverter (SA-CFPPRI)" IEEE. 2004. pp. 61-67.

Chen et al. "A Novel Single Stage Push Pull Converter with Integrated Magnetics and Ripple-free Input Current."

Madawala et al. "Mathematical model for split-capacitor push-pull parallel resonant converter in Buck mode." IET Power Electron. vol. 1. No. 3. 2008. pp. 356-367.

Madawala et al. "Operation of a Split-Capacitor Push-Pull Parallel Resonant Converter in Buck Mode." IEEE. 2007. pp. 1586-1591.

Peretz et al. "The self-adjusting current-fed push-pull parallel resonant inverter as a high frequency AC bus driver." IIAIT J. of Sci & Engineering. vol. 2. I. 3-4. 2005. pp. 352-364.

(56) References Cited

OTHER PUBLICATIONS

Peretz et al. "The Self-Adjusting Current-Fed Push-Pull Parallel Resonant Inverter as high frequency AC bus driver." IEEE. 2004. pp. 52-55.

Thrimawithana et al. "A novel buck-boost control technique for push-pull parallel-resonant converters." IEEE. 2006. pp. 2805-2810.

Thrimawithana et al. "Analysis of Split-Capacitor Push-Pull Parallel Resonant Converter in Normal Mode." SPEEDAM IEEE. 2008. pp. 778-783.

Thrimawithana et al. "Analysis of Split-Capacitor Push-Pull Parallel Resonant Converter in Boost Mode." IEEE. vol. 23. No. 1. 2008. pp. 359-368.

Wu, T. et al., "Soft-Switching Bidirectional Isolated Full-Bridge Converter with Active and Passive Snubbers", IEEE Transactions on Industrial Electronics, Mar. 2014, vol. 61, No. 3, pp. 1368-1376.

Weerasinghe. "A novel resonant converter for low to medium power IPT applications", published Dec. 6, 2014.

Unknown. "Design of a 100 W Active Clamp Forward DC-DC Converter for Telecom Systems Using the NCP1562", http://onsemi.com, May 2013.

King et al., "Incorporating Active-Clamp Technology to Maximize Efficiency in Flyback and Forward Designs", 2010 Texas Instruments Power Supply Design Seminar.

Zhao, T. et al., "Optimal Operation Point Tracking Control for Inductive Power Transfer System" 2015 IEEE Wireless PowerTransfer Conference (WPTC) May 13-15, 2015.

Rashid, M.H. et al., "Power Electronics Handbook: Devices, Circuits, and Applications" Third Edition, published by Elsevier Inc., 2001.

Ren, U.S. Appl. No. 15/537,139, filed Jun. 16, 2017.

D.J. Thrimawithana et al., Analysis of Split-Capacitor Push-Pull Parallel Resonant Converter in Normal Mode, International Symposium on Power Electronics, 2008, p. 778-783, Electrical Drives, Automation and Motion Department of Electrical & Computer Engineering, The University of Auckland, Auckland, New Zealand.

INDUCTIVE POWER TRANSMITTER

FIELD

This invention relates to an inductive power transmitter. The power transmitter is able to regulate, at least to some degree, the power provided to its transmitter coil without requiring information as to operating parameters on the receiver side.

BACKGROUND

Inductive power transfer (IPT) technology is an area of increasing development and IPT systems are now utilised in a range of applications and with various configurations. Typically, a primary side (i.e., an inductive power transmitter) will include a transmitting coil or coils configured to generate an alternating magnetic field. This magnetic field induces an alternating current in the receiving coil or coils of a secondary side (i.e., an inductive power receiver). This induced current in the receiver can then be provided to some load, for example, for charging a battery or powering a portable device. In some instances, the transmitting coil(s) or the receiving coil(s) may be suitably connected with capacitors to create a resonant circuit. This can increase power throughput and efficiency at the corresponding resonant frequency.

A problem associated with IPT systems is regulating the amount of power provided to the load. It is important to regulate the power provided to the load to ensure the power is sufficient to meet the load's power demands. Similarly, it is important that the power provided to the load is not excessive, which may lead to inefficiencies. Generally, there are two approaches to power control in IPT systems: transmitter-side power control and receiver-side power control.

In transmitter-side power control, the transmitter is typically controlled to adjust the power of the generated magnetic field (for example, by adjusting the power supplied to the transmitting coil(s)).

In receiver-side power control, the receiver is controlled to adjust the power provided to the load from the receiving coils (for example, by including a regulating stage or by adjusting the tuning of the receiver).

A problem associated with some transmitter-side power control systems is that they require measurement of receiver-side operational parameters and communication of these to the transmitter, increasing complexity and cost of both the transmitter and receiver.

One known approach is to rely upon primary side real and imaginary components of the tank capacitor voltage to infer receiver output voltage and coil coupling. Without accurate measurement of these parameters the controller cannot accurately control power. It can be difficult and expensive to obtain useful phase measurements, especially at light loads where the resonant waveforms may become non-sinusoidal. Phase information may also be influenced by many variables in the system making it difficult to isolate phase components. Filtering may be employed, however this will add complexity and delay. In summary, it can be difficult and expensive to produce a cost effective and responsive solution suitable for real world applications using this approach.

Further in the above approach primary side only control (i.e. no power flow control is provided on the secondary side) is employed. Whilst this may be suitable for stable loads without sudden changes in the load requirements it is not suitable for applications where there may be sudden changes in load requirements and may result in instability.

Accordingly, the object of the present invention is to provide an improved IPT transmitter or to at least provide the public with a useful choice.

SUMMARY

According to one exemplary embodiment there is provided an IPT power transmitter including:
a. a resonant circuit including a transmitter coil;
b. a power supply;
c. a switching circuit receiving power from the power supply and supplying an alternating voltage output to the resonant circuit;
d. current sensors which measure the output current of the power supply and the current supplied to the resonant circuit; and
e. a controller which controls the switching of the switching circuit based on a duty cycle wherein the duty cycle is adjusted based on the ratio of the output current of the power supply and the current supplied to the resonant circuit (the current ratio).

According to another aspect there is provided an IPT power transmitter including:
a. a resonant circuit including a transmitter coil;
b. a controllable power supply;
c. a switching circuit receiving power from the controllable power supply and supplying an alternating voltage output to the resonant circuit;
d. current sensors which measure the output current of the power supply and the current supplied to the resonant circuit; and
e. a controller which controls the output voltage of the controllable power supply based on the ratio of the output current of the power supply and the current supplied to the resonant circuit.

According to a further aspect there is provided an IPT power transmitter including:
a. a resonant circuit including a transmitter coil;
b. a controllable power supply;
c. a switching circuit receiving power from the controllable power supply and supplying an alternating voltage output to the resonant circuit; and
d. a controller which controls the output voltage of the controllable power supply and the duty cycle of the switching circuit to control the amount of power supplied to the resonant circuit.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e., they will be taken to mean an inclusion of the listed components which the use directly references, and possibly also of other non-specified components or elements.

Reference to any document in this specification does not constitute an admission that the document is prior art, that it is validly combinable with other documents or that it forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed

DETAILED DESCRIPTION

Figure 1:
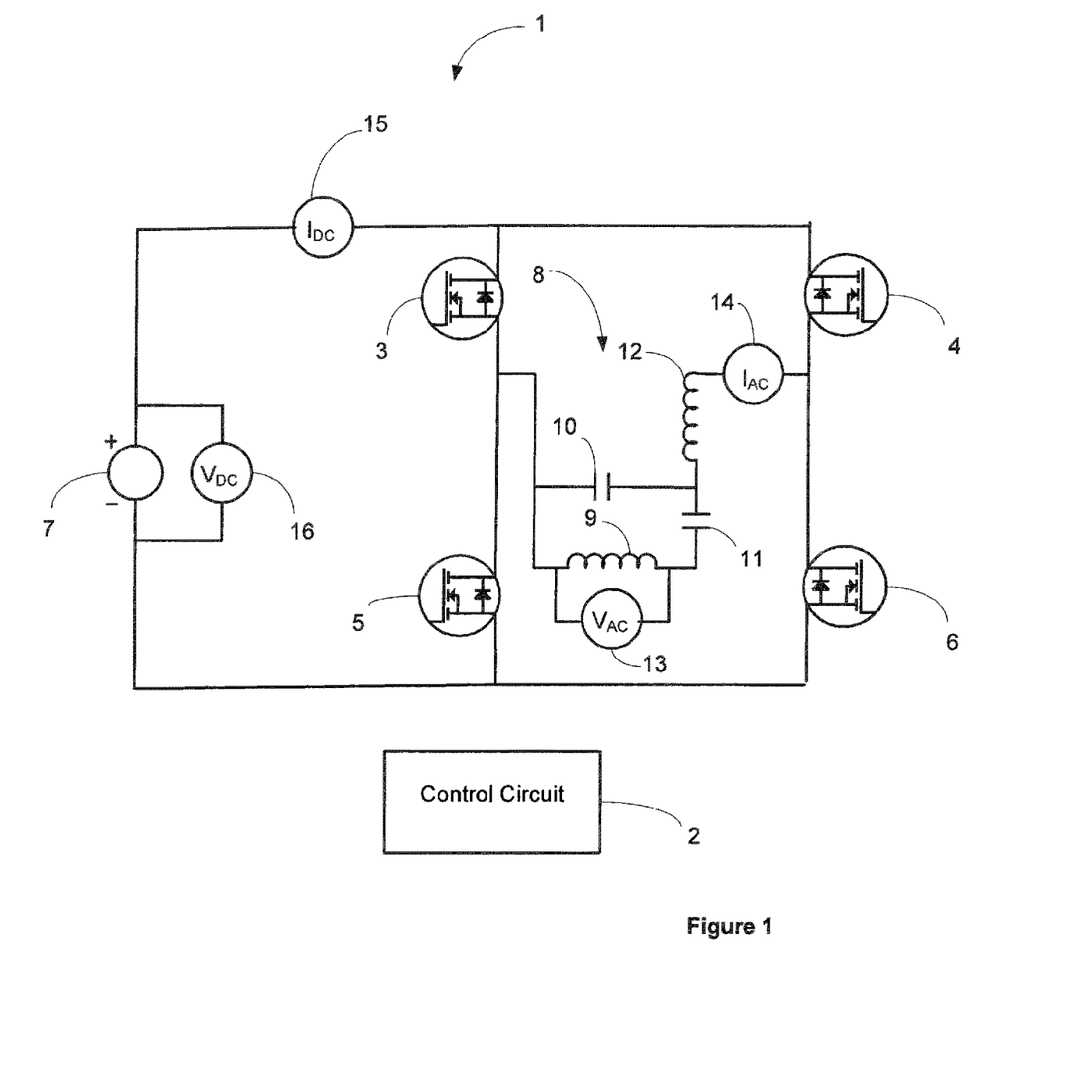
FIG. 1 is a circuit diagram of an inductive power transfer transmitter according to one embodiment.
Figure 2:
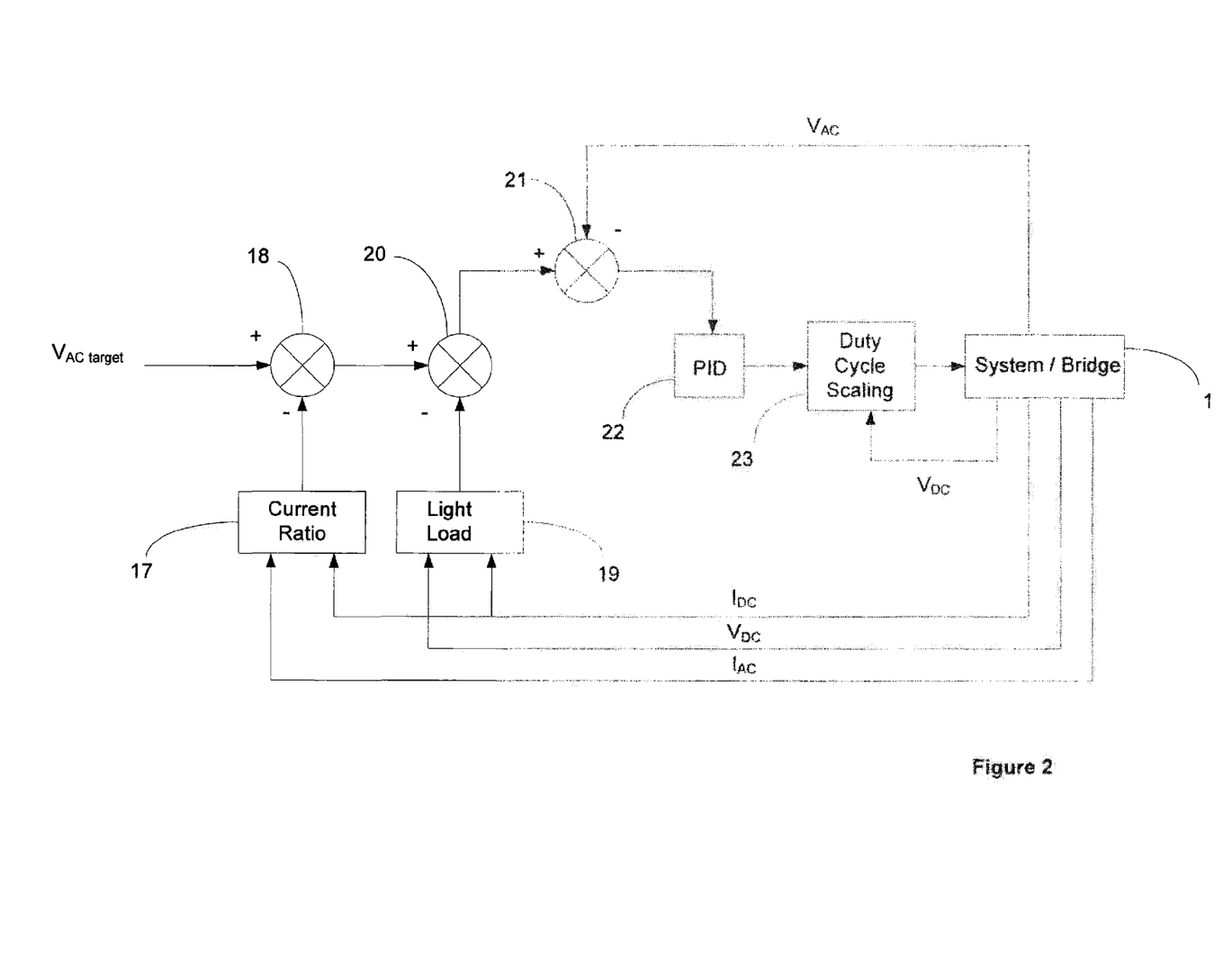
FIG. 2 is a schematic diagram of the control circuit which controls operation of the circuit shown in FIG. 1.

FIGS. 1 and 2 show an IPT transmitter circuit and its control circuit according to one preferred embodiment. In this embodiment the IPT transmitter is preferably of single stage topology and performs coarse power flow control with an associated IPT receiver performing fine power flow control. This approach is simple and efficient and avoids complexity and expense on the transmitter side in the form of complex control circuitry, communications and accurate measurement devices and allows reasonably simple receiver side power flow controllers to be employed. However, where a load supplied by an IPT power receiver has flexible power requirements power flow control may not be required on the secondary side.

The transmitter circuit 1 includes an H bridge formed of switches 3 to 6 which alternately switch in pairs (switches 3 and 6 on and 4 and 5 off; then 4 and 5 on and 3 and 6 off) under the control of control circuit 2 (drive lines not shown for simplicity of representation) to alternately supply a voltage of alternating polarity from DC supply 7 to a resonant circuit 8. In this example the resonant circuit includes transmitter coil 9, tank capacitor 10, tuning capacitor 11 and tuning inductor 12. However, it is to be appreciated that LCL, LCCL, CLCCL or other suitable resonant circuit topologies may be used. The bridge is switched at high frequency (typically around 200 kHz) with the duty cycle adjusted by control circuit 2 to maintain a desired voltage across the transmitter coil 9. Voltage sensor 13 monitors the voltage across the transmitter coil and supplies this to control circuit 2. Current sensor 14 monitors the current flowing through tuning inductor 12 and supplies this to control circuit 2. Current sensor 15 monitors the current supplied by DC power supply 7 and supplies this to control circuit 2. Voltage sensor 16 monitors the output voltage of DC power supply 7 and supplies this to control circuit 2. The connections from the voltage and current sensors to control circuit 2 are also omitted for simplicity of representation.

Referring now to FIG. 2 a schematic diagram of control circuit 2 illustrates its operation. The voltage $V_{AC}$ is the measured voltage across the transmitter coil. The voltage $V_{AC\ target}$ represents the maximum required voltage across the transmitter coil and is determined by placing the transmitter coil and receiver coil of a transmitter/receiver pair at the maximum desired coil spacing and measuring the required transmitter coil voltage $V_{AC}$ required to achieve desired operation, which is adopted as the reference voltage $V_{AC\ target}$. As the transmitter and receiver coils are brought closer together the voltage $V_{AC}$ required across the transmitter coil decreases and is compensated for as discussed below.

As will be seen in FIG. 2 at the most general level the difference between the measured transmitter coil voltage $V_{AC}$ and the target transmitter coil voltage $V_{AC\ target}$ is used to control the duty cycle for switching the H bridge. However, a number of sub-control strategies may be employed to refine control.

The ratio of the current $I_{AC}$ to $I_{DC}$ provides a good proxy for coil coupling. As coupling increases (i.e. the transmitter and receiver coils are closer together) the required voltage across the transmitter coil $V_{AC}$ decreases and so the ratio of the current $I_{AC}$ to $I_{DC}$ determined and scaled at 17 and is subtracted from the target voltage $V_{AC\ target}$ by summer 18 to compensate for changes in coil coupling. This is the primary feedback component used to adjust $V_{AC\ target}$.

It may also be desirable to include a feedback component based on the level of power supplied by the power supply. This component provides compensation when the power supplied by the power supply 7 is high to further reduce $V_{AC\ target}$. This improves efficiency during light load operation to scale the transmitter power output to better match the receiver power requirements. The product $V_{DC}*I_{DC}$ is determined and scaled at 19 and subtracted at summer 20.

Summer 21 subtracts the output of summer 20 from $V_{AC}$ as measured by circuit 1 to produce an error signal as stated below:

$$\text{Error} = V_{AC\ target} - K_1*(I_{AC}/I_{DC}) - K_2*(V_{DC}/I_{DC}) - V_{AC}$$

This error signal is utilised to control the switching duty cycle of the H bridge to maintain the required transmitter coil voltage. The terms $K_1*(I_{AC}/I_{DC})$ and $K_2*(V_{DC}*I_{DC})$ will provide little or no feedback at maximum transmitter and receiver coil separation and will increasingly provide negative feedback as the coils come closer together.

Operation of the controller may be further enhanced by further conditioning of the error signal. In a first stage the error signal may be rate limited. In FIG. 2 a PID controller is employed, although a simple proportional control element may also be used. Rate control may also be performed using other circuits such as a micro bang bang controller which limits the step change allowed in any iteration.

The error signal may be further conditioned by scaling the duty cycle at 23 based on the output voltage $V_{DC}$ of the DC supply 7. This directly compensates for changes in the output voltage $V_{DC}$ of the DC supply 7 by adjusting the duty cycle in dependence upon $V_{DC}$. The output signal of component 23 is supplied to circuit 1 to set the duty cycle for switching of the H bridge.

Figure 3:
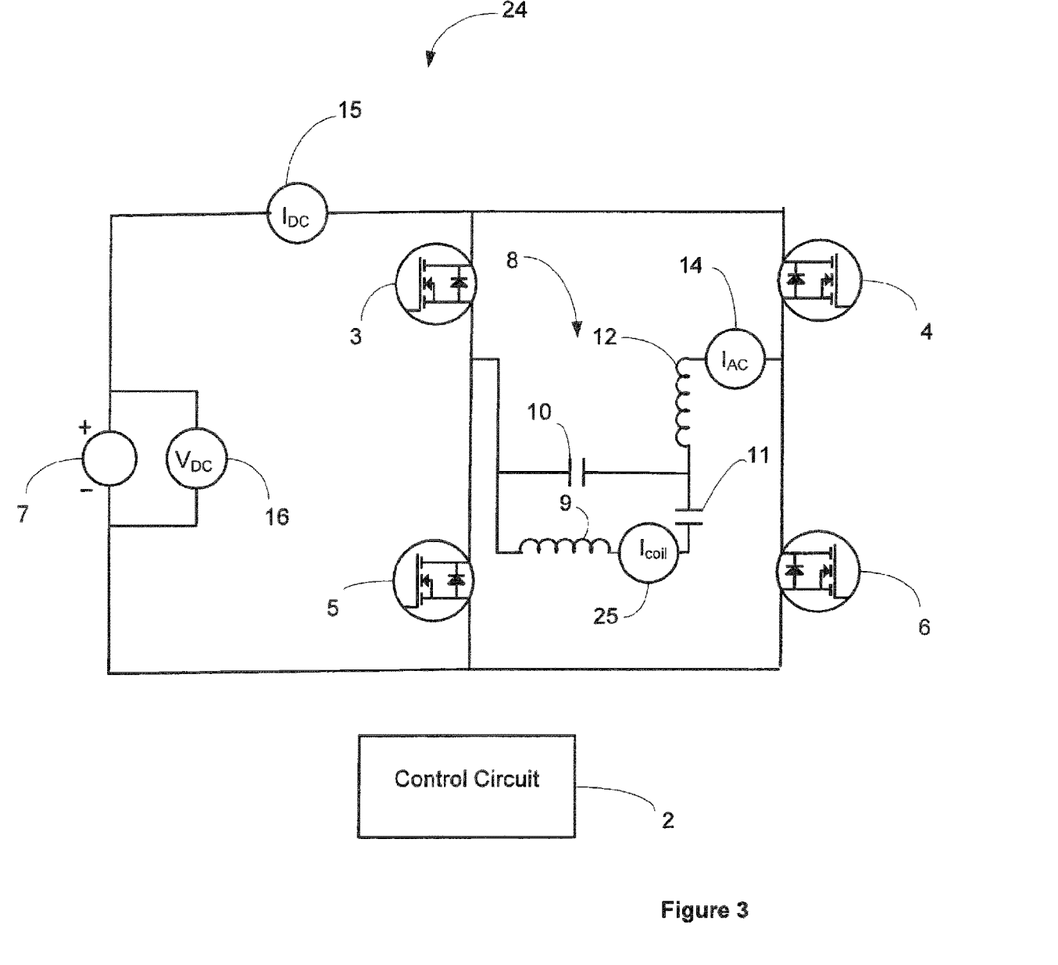
FIG. 3 is a circuit diagram of an inductive power transfer transmitter according to another embodiment.
Figure 4:
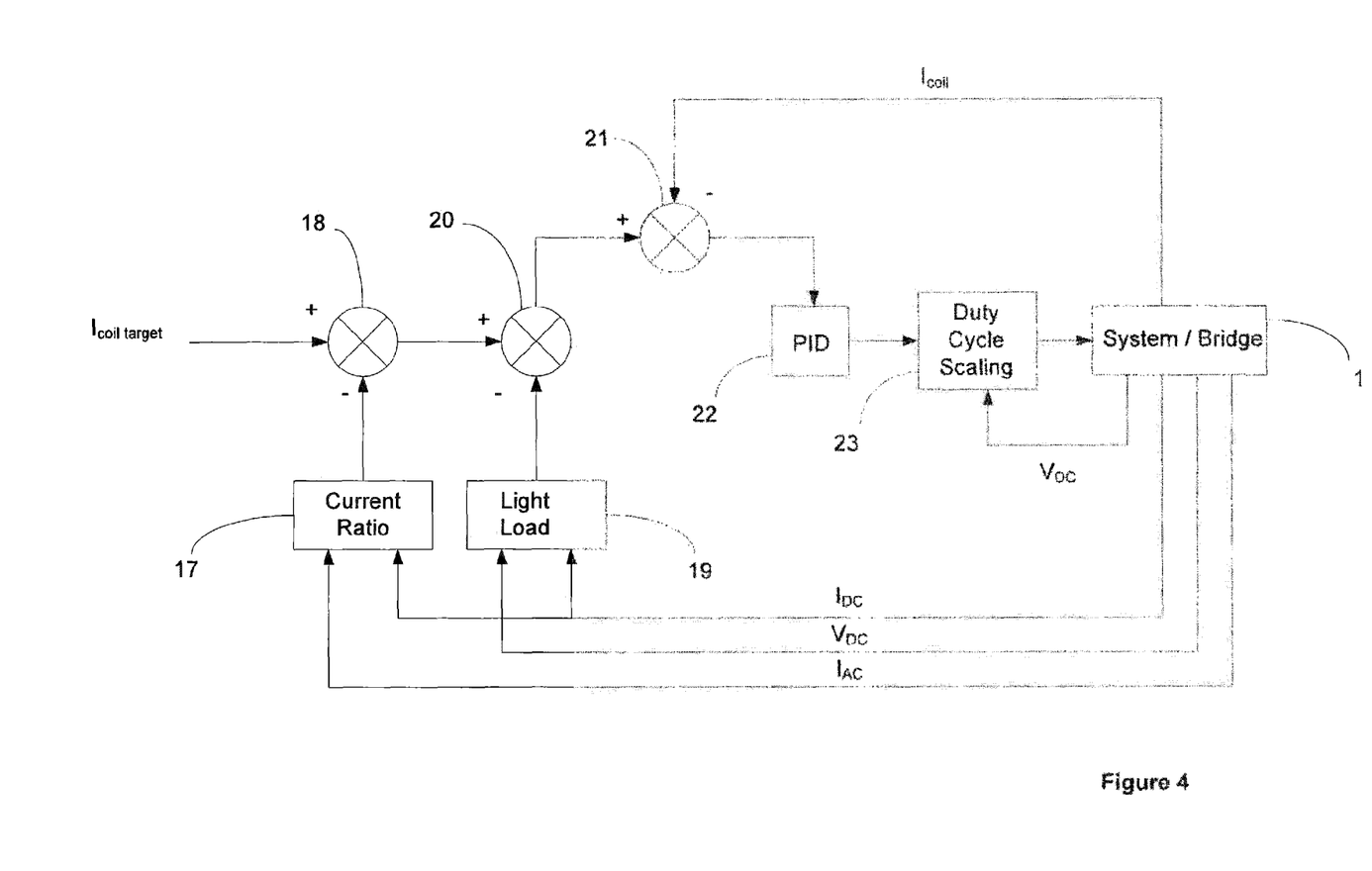
FIG. 4 is a schematic diagram of the control circuit which controls operation of the circuit shown in FIG. 3.

FIG. 3 shows a modified circuit 24 in which the components are as per FIG. 1 except that the voltage sensor 13 has been removed and current sensor 24 has been added which measures the AC current passing through the transmitter coil 9. In this embodiment a transmitter coil current based strategy may be employed instead of the voltage based strategy described in relation to FIGS. 1 and 2. FIG. 4 shows a schematic diagram of the control strategy employed which is analogous to that shown in FIG. 2 (and so like functional blocks have been given like numbers) except that it is based on transmitter coil current rather than voltage. The duty cycle is adjusted based on the difference between a target coil current $I_{coil\ target}$ and the measured coil current $I_{coil}$ with compensation for the current ratio at 17 and light load at 19 as previously described in relation to FIG. 2. Smoothing is performed by PID 22 and duty cycle scaling at 23.

It will be appreciated that both of the above embodiments could be combined to effect control based both on transmitter coil voltage and transmitter coil current. This embodiment would provide control based on power rather than just voltage or current. This would provide the reactive power of the primary tank, and so would provide the most accurate control, although it would require two transmitter coil sensors as opposed to one.

Figure 5:
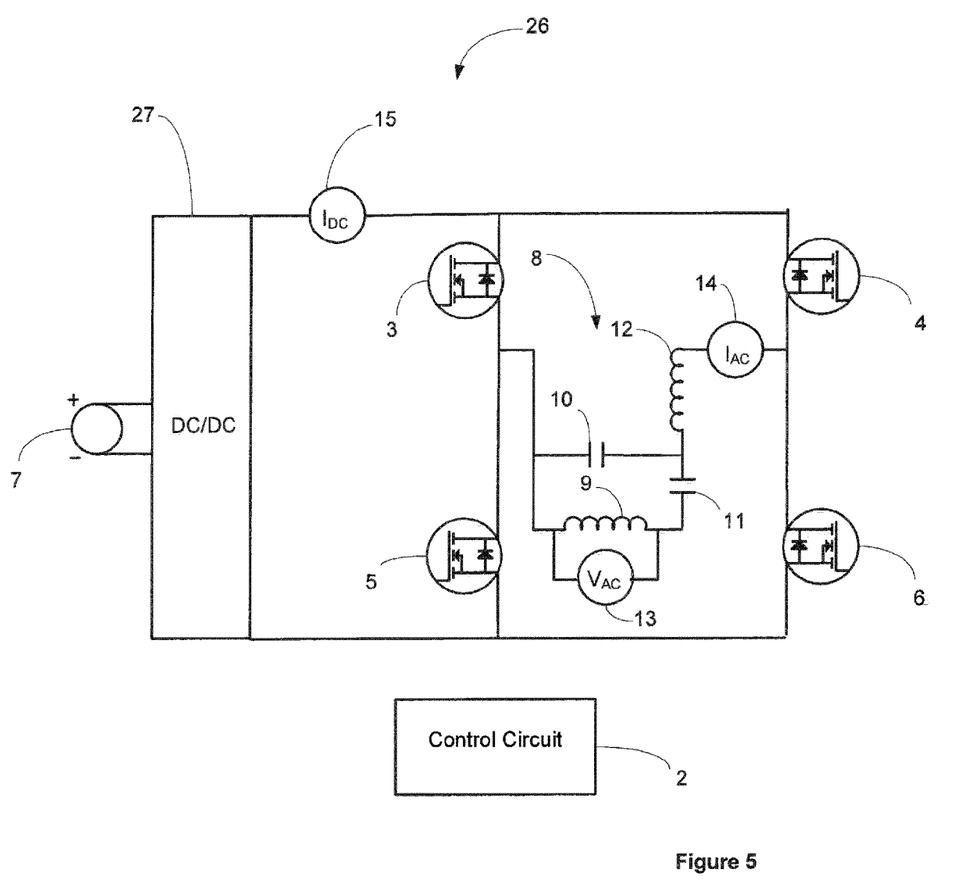
FIG. 5 is a circuit diagram of an inductive power transfer transmitter according to a further embodiment.

FIG. 5 shows a modified form of the circuit shown in FIG. 1 in which the circuit 26 includes a DC/DC converter 27 interposed between the DC supply 7 and the H bridge. Otherwise the components are as per FIG. 1. Whilst this design does add the additional cost and complexity of a DC/DC converter it may allow the current scaling section 23 to be omitted as $V_{DC}$ is constant. If the output voltage of the DC/DC converter 25 is controllable this topology also gives the option of controlling the output voltage (either alone or in combination with duty cycle) to achieve power regulation.

Instead of increasing the duty cycle to increase power and reducing it to decrease power, the output voltage of the DC/DC converter may be adjusted to do this (i.e. increase the output voltage of DC/DC converter 27 to increase power and decrease the output voltage of DC/DC converter 27 to decrease power.

It will be appreciated that both duty cycle control and DC/DC converter output voltage control may be employed together. This provides greater flexibility to decrease or increase power through the use of both mechanisms. In this embodiment the IPT transmitter may be controlled to work at much higher and lower coupling coefficient values which may enable the minimum spacing between transmitter and receiver coils to be reduced (decreased Z-distance).

For example, where an IPT system is designed to operate over a large range of coil separation distances (large Z-distance range) and operate at a close coil separation (small Z-distance) duty cycle control alone may not be sufficient at close coil separation to handle the current through the tuning coil unless a very large tuning inductor is used. However, by controlling the output voltage of the DC/DC converter as well as the duty cycle, this problem can be overcome and a greater range of coil separation may be accommodated.

The above embodiments have been found to provide effective control over a wide range of transmitter and receiver coil spacings and power requirements whilst being a relatively simple, compact and inexpensive design. The approach is not dependent upon the receiver topology employed and so may be used in a wide range of applications.

While the present invention has been illustrated by the description of the embodiments thereof, and while the embodiments have been described in detail, it is not the intention of the Applicant to restrict or in any way limit the scope of the appended claims to such detail. For example it will be appreciated that the embodiment disclosed may be adapted for use with an AC power supply. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. An IPT power transmitter including:
   a. a resonant circuit including a transmitter coil;
   b. a power supply;
   c. a switching circuit receiving current from the power supply and outputting an alternating current to the resonant circuit;
   d. current sensors which measure the output current of the power supply and the current supplied to the resonant circuit; and
   e. a controller which controls the switching of the switching circuit based on a duty cycle wherein the duty cycle is adjusted based on a ratio of the current of the power supply received by the switching circuit and the alternating current output by the switching circuit (the current ratio).

2. An IPT power transmitter as claimed in claim 1 wherein the power supply is a DC power supply.

3. An IPT power transmitter as claimed in claim 1 wherein the power supply is a AC power supply.

4. An IPT power transmitter as claimed in claim 1 wherein the controller adjusts the duty cycle based on an error signal produced by a comparison of a target voltage across the transmitter coil less a measured voltage across the transmitter coil less a component based on the current ratio.

5. An IPT power transmitter as claimed in claim 4 wherein the error signal is compensated based on a level of power supplied by the power supply to the switching circuit.

6. An IPT power transmitter as claimed in claim 5 wherein the error signal is reduced in dependence upon the level of power supplied by the power supply.

7. An IPT power transmitter as claimed in claim 6 wherein the level of power supplied by the power supply is determined based on a product of an output voltage of the power supply and an output current of the power supply.

8. An IPT power transmitter as claimed in claim 4 wherein a rate of change of the error signal is limited.

9. An IPT power transmitter as claimed in claim 8 wherein the rate of change is limited by a proportional controller.

10. An IPT power transmitter as claimed in claim 8 wherein the rate of change is limited by a PID controller.

11. An IPT power transmitter as claimed in claim 8 wherein the rate of change is limited by a step limited controller.

12. An IPT power transmitter as claimed in claim 4 wherein the error signal is scaled based on an output voltage of the power supply.

13. An IPT power transmitter as claimed in claim 4 wherein the target voltage is a desired operating coil voltage at a maximum desired separation between the transmitter coil and a receiver coil.

14. An IPT power transmitter as claimed in claim 1 wherein the power supply is a controllable power supply and wherein an output voltage of the controllable power supply is adjusted to control a supply of power to the resonant circuit.

15. An IPT power transmitter as claimed in claim 1 wherein the controller adjusts the duty cycle based on an error signal produced by a comparison of a target current through the transmitter coil less a measured current through the transmitter coil less a component based on current ratio.

16. An IPT power transmitter as claimed in claim 1 wherein the controller adjusts the duty cycle based on an error signal produced by a comparison of a target power level through the transmitter coil less a measured power through the transmitter coil less a component based on current ratio.

17. An IPT power transmitter including:
   a. a resonant circuit including a transmitter coil;
   b. a controllable power supply;
   c. a switching circuit receiving current from the controllable power supply and outputting an alternating current to the resonant circuit;

d. current sensors which measure the output current of the power supply and the current supplied to the resonant circuit; and e. a controller which controls an output voltage of the controllable power supply based on a ratio of the current of the power supply received by the switching circuit and the alternating current output by the switching circuit.

18. An IPT power transmitter as claimed in claim 17 wherein both the output voltage of the controllable power supply and the duty cycle of the switching circuit are controlled based on the ratio of the current of the power supply received by the switching circuit and the alternating current output by the switching circuit.

19. An IPT power transmitter including:

a. a resonant circuit including a transmitter coil;

b. a controllable power supply;

c. a switching circuit receiving power from the controllable power supply and supplying an alternating voltage output to the resonant circuit; and d. a controller which controls the output voltage of the controllable power supply and the duty cycle of the switching circuit to control the amount of power supplied to the resonant circuit.

* * * * *